United States Patent [19]

Oka et al.

[11] 3,846,754

[45] Nov. 5, 1974

[54] PATTERN PRE-PROCESSING APPARATUS

[75] Inventors: Mitsunori Oka, Hachioji; Michio Yasuda, Koganei, both of Japan

[73] Assignee: Hitachi, Ltd., Tokyo, Japan

[22] Filed: Apr. 4, 1973

[21] Appl. No.: 347,662

[30] Foreign Application Priority Data

Apr. 7, 1972 Japan .............................. 47-34375

[52] U.S. Cl. ................ 340/146.3 H, 340/146.3 MA

[51] Int. Cl. ............................................ G06k 9/02

[58] Field of Search ........... 340/146.3 H, 146.3 AG, 340/146.3 MA, 146.3 AC, 146.3 J; 178/DIG. 3

[56] References Cited

UNITED STATES PATENTS

| | | | |
|---|---|---|---|
| 3,140,466 | 7/1964 | Greanias et al. | 340/146.3 H |
| 3,196,398 | 7/1965 | Baskin | 340/146.3 H |
| 3,541,511 | 11/1970 | Genchi et al. | 340/146.3 AC |
| 3,735,349 | 5/1973 | Beun et al. | 340/146.3 H |

OTHER PUBLICATIONS

Bomba, "Character Recognition Using Local Operations," 1959, Proceedings of Eastern Joint Computer Conference, pp. 218–224.

*Primary Examiner*—Gareth D. Shaw
*Assistant Examiner*—Leo H. Boudreau
*Attorney, Agent, or Firm*—Craig & Antonelli

[57] ABSTRACT

A pattern pre-processing apparatus for pattern recognition systems which shapes a quantized input pattern obtained by the scanning of an input pattern. The apparatus comprises at least one shift register for storing and shifting the input pattern in the order as it is scanned, and pattern thinning means for receiving, on the basis of a prespecified bit position of the shift register, the bit contents in accordance with the input pattern of selected bit positions located adjacent to said prespecified bit position, whereby when the contents of the adjoining bit positions indicate any one of a predetermined set of patterns, the content of the prespecified bit position is erased and the resultant signal is produced from the pattern thinning means.

6 Claims, 18 Drawing Figures

FIG. 9
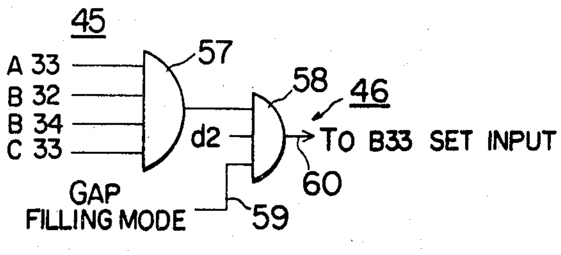
FIG. 10
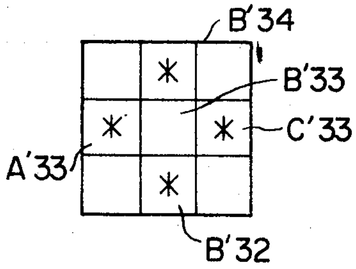
FIG. 11
| | | | |
|---|---|---|---|
| A36 | B36 | C36 | D36 |
| A35 | B35 | C35 | D35 |
| A34 | B34 | C34 | D34 |
| A33 | B33 | C33 | D33 |

PATTERN PRE-PROCESSING APPARATUS

BACKGROUND OF THE INVENTION

1. FIELD OF THE INVENTION

The present invention relates to a pattern pre-processing apparatus and more particularly to a pattern pre-processing apparatus used in a pattern recognition logical system to shape the scanned pattern signal prior to its application to the pattern recognition logical unit.

2. DESCRIPTION OF THE PRIOR ART

Apparatus designed to perform character recognition, edge line recognition of three dimensional figures, map recognition or recognition of finger prints or portraits may be termed as pattern recognition systems. The pattern recognition system employs a scanner, e.g., a flying spot scanner, vidicon tube or a photoelectric conversion element matrix which scans a pattern on a document and converts it into an electric signal, whereby the electric signal is quantized (digitized), for example, according to the luminance variations in the black and white. In other words, the electric signals produced by the scanning of the white background area are converted into binary "0's", while those electric signals produced by the scanning of the pattern area are converted into binary "1's". This digitized pattern signal is then applied to the pattern pre-processing unit where the signal is processed to remove noise, for example, so that it may be properly recognized in the succeeding recognition logical unit when it is applied thereto. The recognition logical unit makes a recognition as to the input character's identity. There are different ways of performing the pattern recognition in the recognition logical unit. For example, the recognition logical unit is provided with a prespecified set of patterns (characters) so that the electric signal of the pattern scanned by the scanner is superimposed on the pre-specified set of patterns and that pattern which matches the signal most correctly is recognized as the scanned pattern. With another method, the recognition is performed by examining the presence and direction of the various strokes of the character.

The electric signal of the pattern produced by the scanning involves a considerable amount of noise due to the smear on the document carrying the pattern, nonuniform quality of printed characters or the like. Further, the stroke is inscribed with a certain thickness and thus the pattern is presented in the form of an electric signal representing the stroke or strokes having a certain thickness. Thus, it is not proper to digitize the electric signal of the pattern obtained by the scanning thereof as such and then apply to the recognition logical unit. Therefore, it is desirable that the input pattern is processed in the pattern pre-processing unit to remove the noise components contained in the input pattern and to effect the normalizing of the thickness of the input pattern, i.e., the thinning procedure, thereby ensuring a proper recognition of the pattern in the recognition logical unit.

In the past, the greater part of pattern recognition has been performed by means of software techniques. Particularly, there has been almost no precedence of instances in which the thinning procedure was performed by means of a specially designed hardware.

SUMMARY OF THE INVENTION

It is an object of this invention to provide a pattern pre-processing apparatus which properly processes an input pattern prior to its application to a recognition logical unit.

It is another object of the present invention to provide a pattern pre-processing apparatus which performs the thinning process on an input pattern.

It is still another object of the present invention to provide a pattern pre-processing apparatus which removes the noise components contained in an input pattern.

The present invention thus comprises a pattern pre-processing apparatus for pattern recognition systems designed to modify the digitized version of an input pattern produced by the scanning thereof. The apparatus comprises at least one shift register in which an input pattern is stored and shifted in the order as it is scanned, and pattern thinning means for receiving, on the basis of a prespecified bit position of the shift register, the bit contents in accordance with the input pattern of selected bit positions located adjacent to the prespecified bit position and erasing the content of the prespecified bit position to produce the resultant signal when the contents of the adjoining bit positions indicate any one of a predetermined set of patterns.

BRIEF DESCRIPTION OF THE DRAWING

FIG. 9 is a logic diagram showing in detail the gap filling unit and its mode control circuit shown in FIG. 6.

FIG. 10 is a diagram for explaining the gap filling procedure.

FIG. 11 is a diagram showing the corresponding relationships among the logics of FIG. 4 and the bit positions of the first shift register.

DESCRIPTION OF THE PREFERRED EMBODIMENT

Figure 1:
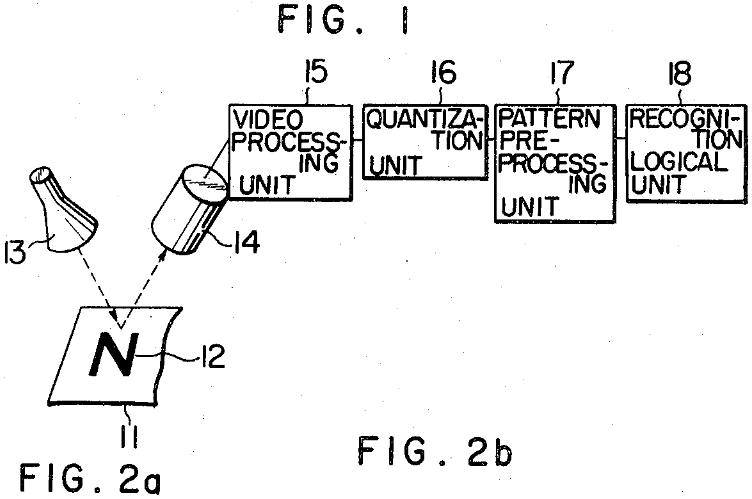
FIG. 1 is a block diagram schematically showing a pattern recognition system.

Referring first to FIG. 1, there is shown a general representation of a pattern recognition system. In this system, a pattern 12 on a document 11 is scanned by a scanner 13 so that a photoelectric conversion element 14 converts the pattern into electric signals by the reflected light. This scanner may consists of any scanner known in the art, e.g., a flying spot scanner, vidicon tube or photoelectric conversion element matrix. The scanning is performed by a conventional method in which the input pattern is scanned by scanning a plurality of vertical or horizontal lines crossing the pattern, from one end to the other end and moving from the other end of each line to one end of the next line by virtue of the prespecified synchronizing signals. This electric signal is applied to a video processing unit 15 where it is subjected to the level adjustment, etc. The signal is then converted in a quantization unit 16 into digital signals which are either 1's or 0's. A pre-processing unit 17 constituting a characteristic feature of the present invention performs the thinning process and the noise removing process on these digital signals and its output is applied to a recognition logical unit 18.

FIGS. *2a* through *2c* show how the input pattern, which is in this case a character "N", is modified by the pre-processing. A pattern 21 designates an input pattern applied to the pre-processing unit 17. In the figures, the marks * indicate the digital 1 signals and the absence of the marks indicate the 0 signals. The outline of the input pattern 21 is not definite and moreover there are gaps or voids 21*a* (a kind of noise) and an isolated point 21*b*. The pre-processing unit fills in the gapped portions 21*a* first. A pattern 22 indicates one which has been subjected to the gap filling process. Then, the thinning process and the noise removing are performed on the pattern, leaving only the skeletal structure of the pattern. A pattern 23 indicates the pattern obtained after the completion of the thinning procedure.

Figures 3, 4, 5A, 5B:
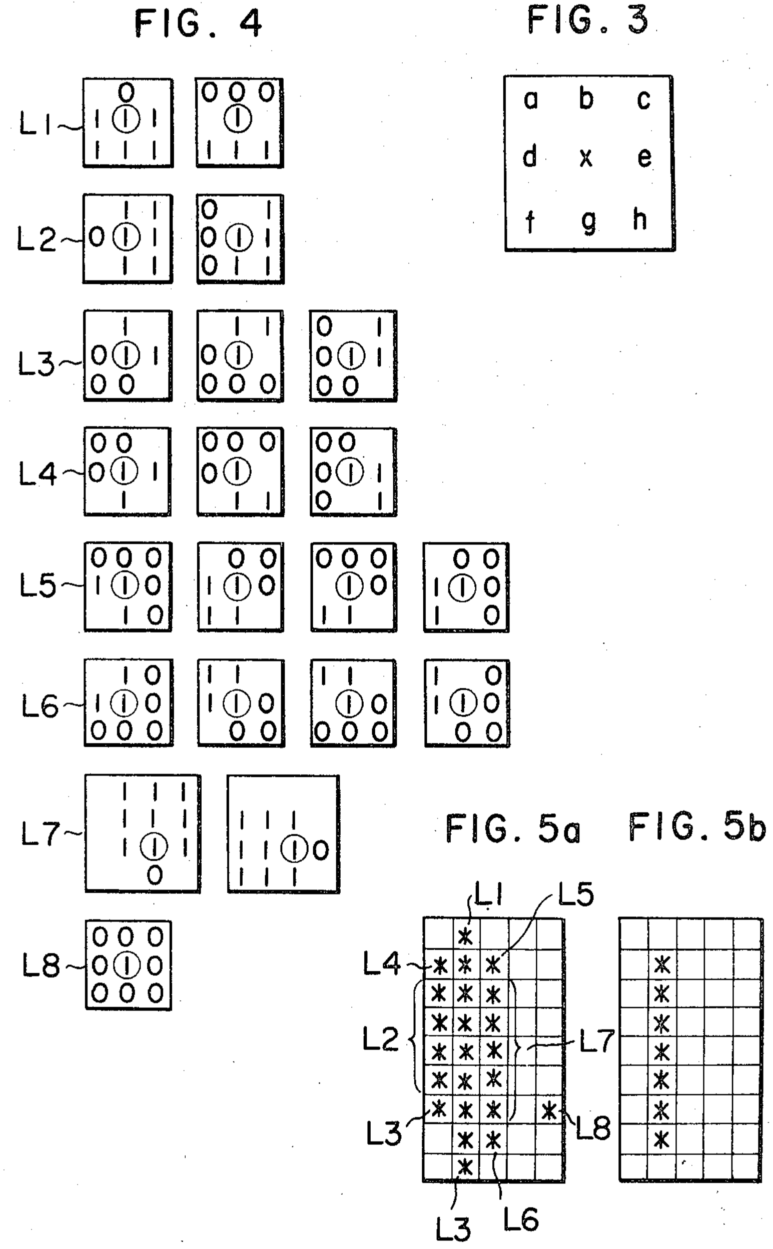
FIG. 3 is a diagram showing the principle of the thinning logic.
FIG. 4 shows a set of logics utilized in an embodiment of the present invention.
FIGS. 5*a* and 5*b* show the thinning process performed on a pattern in accordance with the logics shown in FIG. 4.

Before proceeding with the description of a preferred embodiment of the present invention, the principle of the thinning procedure used in this invention will be explained. The $3 \times 3$ matrix of FIG. 3 shows the principle of the thinning logic and the arrangement of bits *a* through *h* and X is identical with that of bits representing an input pattern. This logic indicates that, depending on the value (either 1 or 0 of the digital signal) assumed by each of the bits *a* to *h* and X, the bit X is erased, i.e., the bit X is placed in the 0 state. FIG. 4 illustrates an example of the thinning logics by the specific $3 \times 3$ matrices which are utilized in a preferred embodiment that will be explained later. These logics show that when the bits surrounding the center bit designated as ① satisifes the illustrated logic, the center bit ① is erased. In the case of the left logic of $L_1$, for example, the center bit X is placed in the 0 state, if the bit *b* is 0 and the bits *d* to *h* are 1's. It also indicates that the bit for the blank space may be either 0 or 1. The logics of $L_7$ use a $3 \times 4$ matrix.

FIGS. *5a* and *5b* show a specific example of the thinning procedure performed in accordance with the thinning logics shown in FIG. 4. In FIG. 5*a*, the bits indicated as $L_1$ to $L_8$ are those which are placed in the 0 state by the logics of $L_1$ to $L_8$ shown in FIG. 4. The pattern thus subjected to these thinning logics is thinned as shown in FIG. 5*b*. A comparison between FIGS. 5*a* and 5*b* shows that the pattern of FIG. 5*b* retains only the skeletal structure consisting of the characteristic properties of the pattern of FIG. 5*a* and it may be considered as one that can be readily recognized.

Figure 6:
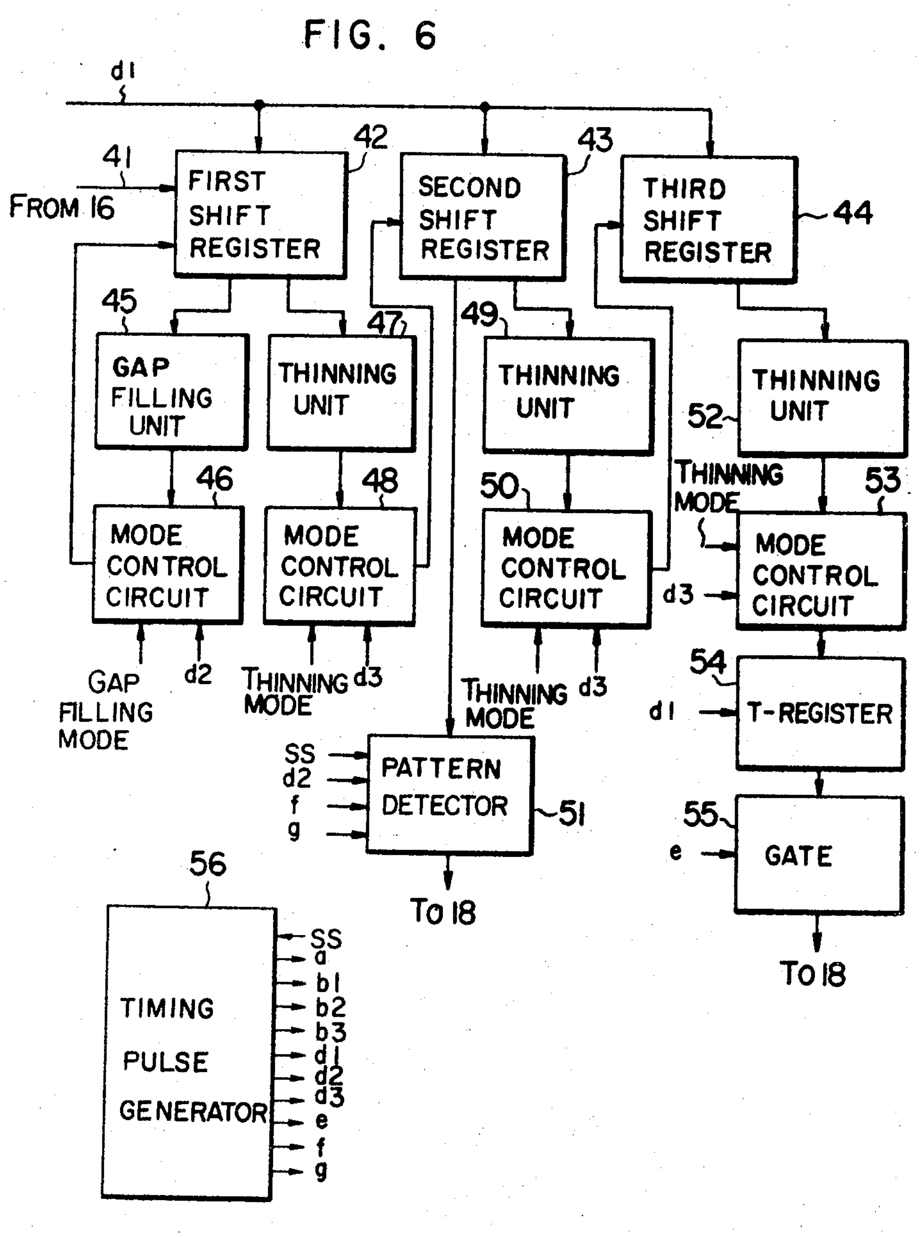
FIG. 6 is a block diagram showing an embodiment of the present invention.

Referring now to FIG. 6, there is shown an embodiment of a pattern pre-processing apparatus according to the present invention. The scanner scans the input pattern lengthwise from the top to the bottom, moving in succession from the right to the left and thus scanning the whole pattern. Therefore, the input pattern signal applied to the pattern pre-processing apparatus from the quantization unit is introduced in a bit-serial mode in accordance with the scanning of the pattern. The number of pattern sampling points for one scanning is 36 and each of the actual patterns can be represented by 32 points or less. Each of these sampling points is converted by the quantization unit into a digital signal representing either 1 or 0 and the resultant pattern signal is applied to the pattern pre-processing apparatus 17.

The input pattern signal from the quantization unit 16 is applied by way of a line 41 to a first shift register 42. While the capacity of the first shift register 42 will be explained later in detail, since the gap filling and thinning processes are performed, as mentioned earlier, with the $3 \times 3$ matrix (the $4 \times 3$ matrix for the logics of $L_7$), it is sufficient if the minimum capacity is such that the signals produced by three scannings of each input pattern can be stored. Thus, a shift register having a capacity of $36 \times 3 = 108$ bits may be used.

Figures 2A, 2B, 2C:
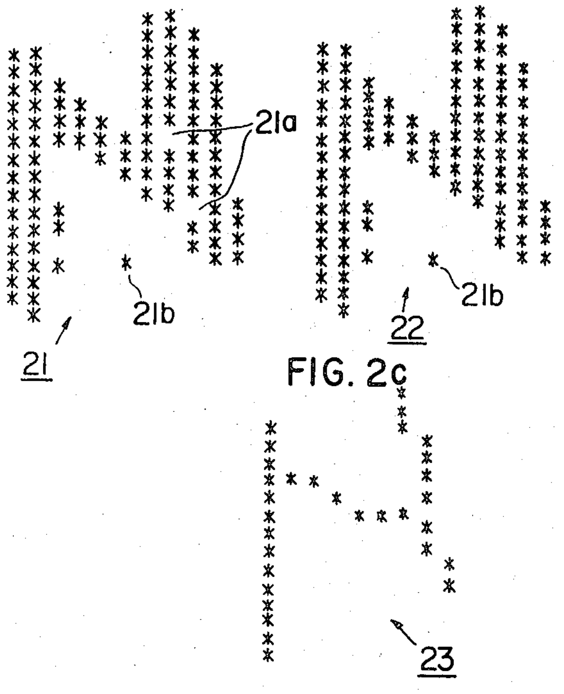
FIGS. 2*a* through 2*c* show a sequence of operations to perform the thinning procedure on a pattern by a pattern pre-processing apparatus according to this invention.

A gap filling unit 45 is connected to the first shift register 42 and its output is reapplied to the first shift register 42 through a mode control circuit 46. The gap filling unit 45 which will be explained in detail later performs the function of filling in gaps, such as, the gap 21a shown in FIG. 2. A first thinning unit 47 is also connected to the first shift register 42. While the first thinning unit 47 will be explained later in detail, its output is applied to a second shift register 43 through a mode control circuit 48.

The second shift register 43 consists of one which is identical with the first shift register 42 and a second thinning unit 49 connected to the second shift register 43. The second thinning unit 49 is also identical with the first thinning unit 47. The output of the second thinning unit 49 is applied to a third shift register 44 through a mode control circuit 50. A pattern detector 51 is connected to the second shift register 43 and its output is applied to the recognition logical unit 18 (FIG. 1), signifying to the recognition logical unit the beginning and the end of a pattern (a character).

The third shift register 44 is identical with the first and second shift registers and a third thinning unit 52 connected to the third shift register 44 is also identical with the first and second thinning units. The output of the third thinning unit 52 is entered into a T-register 54 through a mode control circuit 53 and it is then transferred to the recognition logical unit 18 through a gate 55. The time at which the output of the T-register 54 is applied to the recognition logical unit 18 through the gate 55 is associated with the time at which the output from the pattern detector 51 is applied to the recognition logical unit 18. In other words, in synchronism with the application to the recognition logical unit 18 through the gate 55 of the first portion of the pattern signal of a given pattern, a signal indicating the beginning of the pattern is applied to the recognition logical unit 18 from the pattern detector 51. Further, in synchronism with the application to the recognition logical unit 18 through the gate 55 of the last portion of the pattern signal, a signal indicating the end of the pattern is applied to the recognition logical unit 18 from the pattern detector 51.

In the embodiment shown in FIG. 6, the thinning process is repeated three times. The thinning process may be repeated as many times as desired, the number being dependent on the consideration of the stroke width of the patterns, the pattern scanning pitch, the pattern recognition method used and so on. In the case of the pattern 21 shown in FIG. 2*a*, three thinning processes may result in a pattern retaining only the skeletal structure as is the case with the pattern 23 shown in FIG. 2*c*. Any further thinning process on the pattern 23 may result in one similar to the pattern 23 and thus it is a useless operation. To perform any desired number of the thinning processes, the output of the mode control circuit 48 may be stored in a magnetic core memory device and then reapplied to the first shift register 42 from the magnetic core memory device, whereby the pattern signal is transferred between the first shift register 42 and the magnetic core memory device, thereby effecting the thinning process as many times as desired with only the single shift register.

Figure 7:
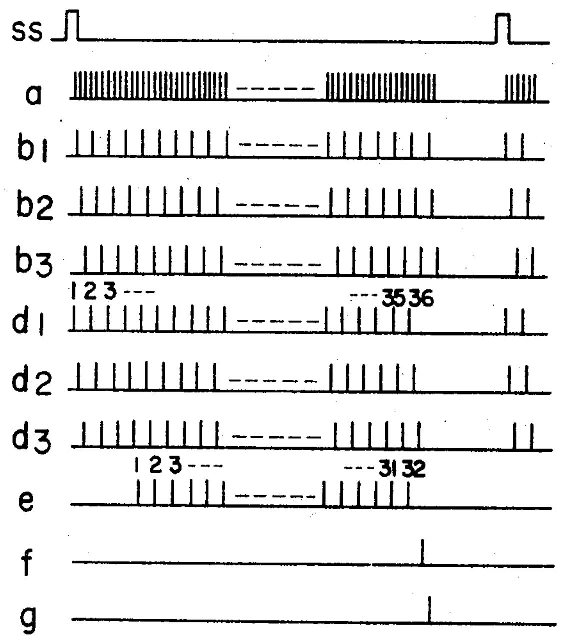
FIG. 7 is a waveform diagram of the timing pulses used in the embodiment of FIG. 6.

In FIG. 6, there is also shown a timing pulse generator 56. The timing pulse generator 56 receives SS signals and generates clock pulses $a$, $b_1$ to $b_3$, $d_1$ to $d_3$, $e$, $f$ and $g$. The clock pulse waveforms are shown in FIG. 7. The SS signals are synchronizing signals generated from a synchronizing signal generator (not shown) to direct the shifting of the scanning lines during the scanning of a pattern by the scanner 13. The scanning of the respective lines are initiated by the SS signals. The application of the SS signal causes the production of the basic clock pulses $a$ from which are produced the clock pulses $b_1$ to $b_3$ in three phases. Of these three-phase clock pulses $b_1$ to $b_3$, a predetermined number of pulses (36 pulses in this embodiment) from the beginning of each scanning line are generated as the clock pulses $d_1$ to $d_3$. This number (36 pulses) corresponds to the sampling points in one scanning line. The clock pulses $d_1$ are applied to the first, second and third shift registers to effect the shifting. The clock pulses $d_2$ are applied to the mode control circuit 46 and are used as the synchronizing pulses for gating the output of the gap filling unit 45. The clock pulses $d_2$ are also applied to the pattern detector 51. The clock pulses $d_3$ are applied to the mode control circuits 48, 50 and 53 and are used as the synchronizing pulses for the thinning processes. The clock pulses $e$ are applied to the gate 55 and are used as the synchronizing pulses for the pattern output to be applied to the recognition logical unit 18. There are 32 clock pulses $d_3$. The reason is that though there are 36 sampling points for each vertical scanning, any given pattern can be found within 32 points of the total sampling points. Further, the clock pulses $f$ and $g$ are applied to the pattern detector 51.

Next, the individual component parts of the embodiment shown in FIG. 6 will be explained in detail.

Shift registers

Figure 8:
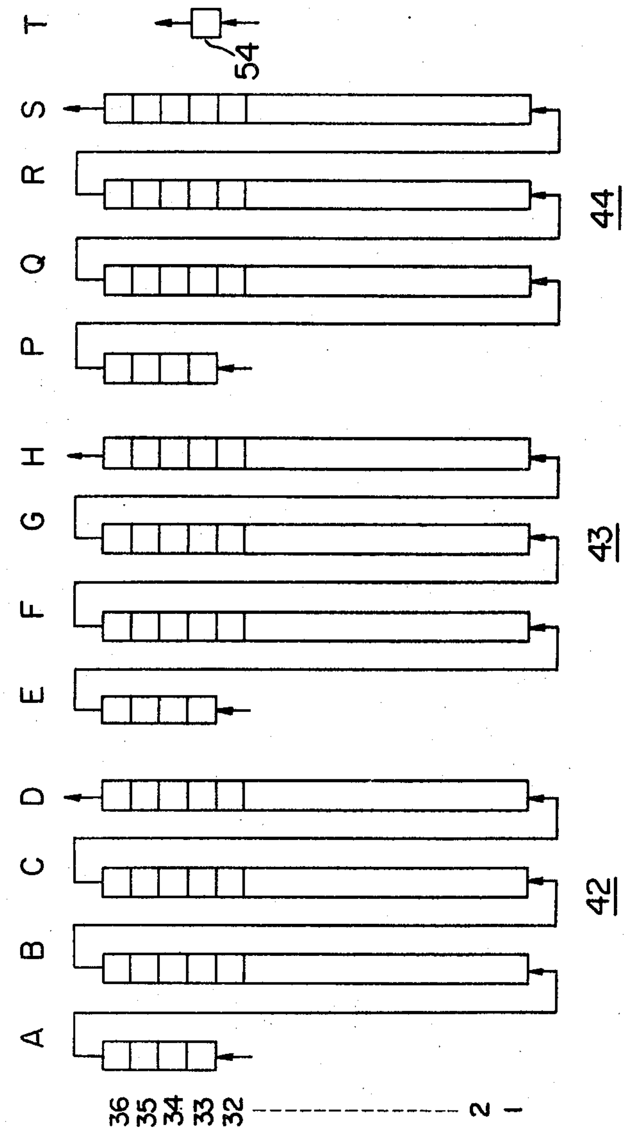
FIG. 8 is a detailed diagram of the first to third shift registers shown in FIG. 6.

Referring to FIG. 8, there are schematically shown the first, second and third shift registers. The T-register 54 is additionally shown. Each of the first, second and third shift registers has a capacity of 112 bits and consists of a 4-bit shift register and three 36-bit shift registers arranged in parallel. The number of 36 bits corresponds to the number of 36 sampling points for one scanning of a pattern by the scanner as mentioned earlier. For easy understanding of the respective bit positions in these shift registers, the first register 12 through the T-register 54 are designated as A through T and the bit positions are indicated by bit numbers 1 to 36 as shown in the figure. For example, the 35th bit position in the A-register is designated as A35. The input pattern signal (digital signal) from the quantization unit 16 is applied at the bit position A33 of the first shift register 42 by way of the line 41. The signal applied at the bit position A33 is shifted through A34, A35, - - - - up to D36 by the clock pulses $d_1$. In this state, the portion of the input pattern scanned by the first scanning is stored in the D-register, the portion scanned by the second scanning is stored in the C-register and the portion scanned by the third scanning is stored in the B-register.

Gap filling unit

In FIG. 9, there are illustrated the gap filling unit 45 and the mode control circuit 46. An AND gate 57 is designed to receive the 1 outputs of the bit positions A33, B32, B34 and C33 so that it is opened when each of the four outputs is 1. The mode control circuit 46 consists of an AND gate 58 which receives the output of the AND gate 57, the clock pulse $d_2$ and $a$ gap filling mode signal 59. To perform the gap filling process, a 1 signal is supplied to the line 59 from a signal generator (not shown) manually or according to a predetermined program. An output line 60 of the AND gate 58 is connected to the set input of the bit position B33. The unit of FIG. 9 has a meaning as shown in FIG. 10. In other words, FIG. 10 illustrates an example of a portion of the input pattern. When the bit positions A'33, B'32, B'34 and C'33 adjoining the bit position B'33 on all sides thereof are in the 1 state, the center bit position B'33 is set to the 1 state. The bit position B'33 corresponds to the gap 21*a* in the pattern shown in FIG. 2. All the bits of the input pattern are caused to pass through the bit position B33 of the first shift register 42. Consequently, the gap filling process is performed in the bit position B33 prior to the effectuation of the thinning procedure.

Thinning units

Figure 12:
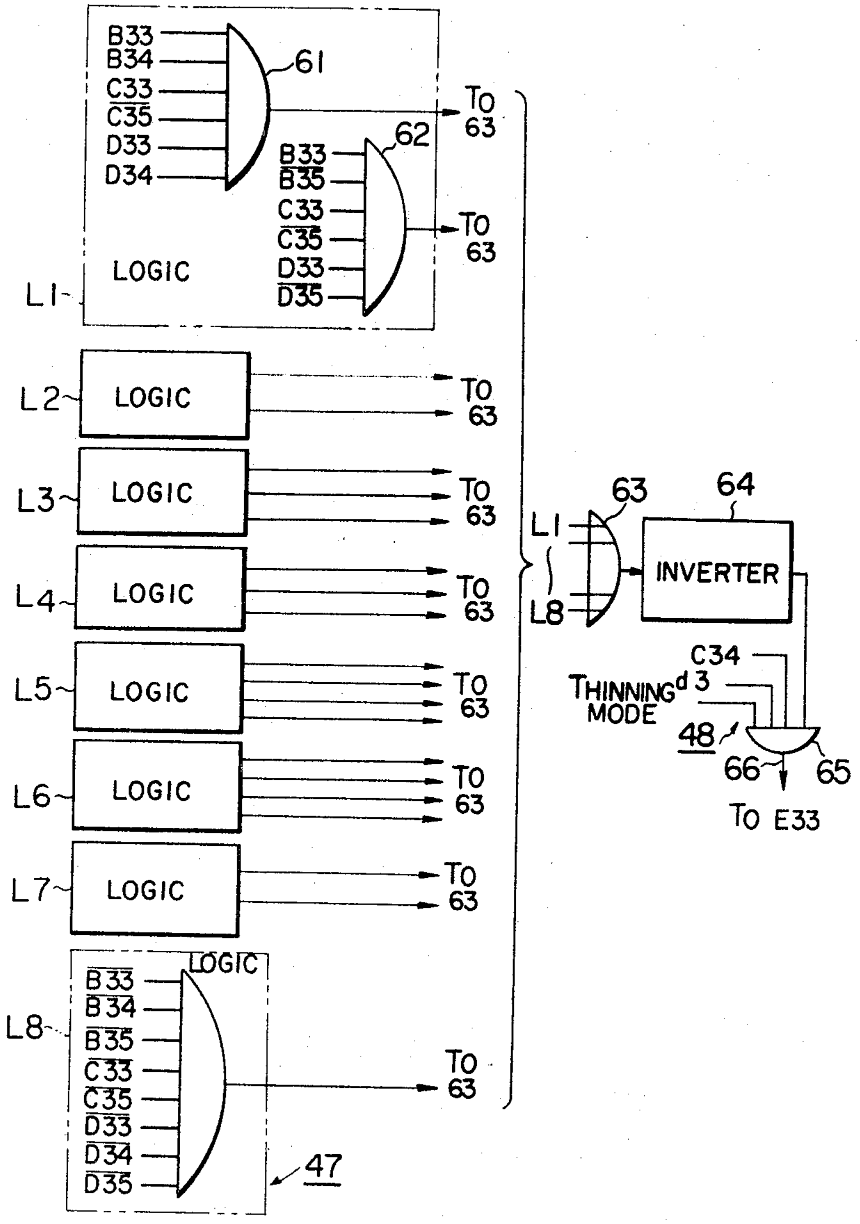
FIG. 12 is a logical diagram showing in detail the first thinning unit and the associated mode control circuit shown in FIG. 6.

FIG. 12 illustrates in detail the thinning unit 47 and the mode control circuit 48 shown in FIG. 6. The thinning unit 47 includes the necessary circuits for performing all the logics shown in FIG. 4. As shown in FIG. 11, the respective bits of the thinning logics of FIG. 4 correspond to the bit positions of the first shift register 42 and the bit position C34 corresponds to the center bit ① . Now consider the case of $L_1$ by way of example. Since $L_1$ has two logics, two AND gates 61 and 62 are provided. The AND gate 61 is designed to receive the 1 outputs of the bit positions B33, B34, C33, D33 and D34 and the 0 output of the bit position C35 (designated as $\overline{C35}$). In other words, the AND gate 61 produces a 1 signal when according to the input pattern the bit contents of the first shift register 42 corresponding to the bit positions adjoining the bit position C34 indicates the predetermined pattern of $L_1$. There are provided similar AND gates for $L_2$ through $L_8$ and the outputs of these AND gates are applied to an OR gate 63. If any one of a large number of the AND gates satisifes the pertaining logic and thus produces a 1 output, the OR gate 63 applies a 1 output to an inverter 64 so that the signal is inverted and a 0 output is applied to an AND gate 65 of the mode control circuit 48. On the other hand, if none of these AND gates is opened, a 0 signal is applied to the inverter 64 so that the AND gate 65 receives a 1 signal.

Also, the 1 output of the bit position C34, clock pulse $d_3$ and thinning mode signal are applied to the AND gate 65 of the mode control circuit 48. The thinning mode signal is applied from the signal generator manually or according to a predetermined program, thereby effecting the thinning process. When the inverter 64 produces a 1 output, i.e., none of the logics of $L_1$ through $L_8$ is satisfied, the content of the bit position C34 is applied as such to the bit position E33 of the second shift register 43. On the other hand, when the inverter 64 produces a 0 output, the AND gate 65 is not opened so that the bit position C34 is assumed as if it were reset, producing a 0 output on a line 66. It should be noticed here that the bit position C34 itself is not reset. In other words, when any of the logics of $L_1$ through $L_8$ is satisfied, the center bit (1) is erased and a 0 is applied to the succeeding shift register, whereas when none of the logics is satisfied, the content of the bit position C34 is applied as such to the succeeding shift register. Thus, as all the bits of the input pattern signal pass through the bit position C34 of the first shift register 42, the content of the bit position C34 is applied as such or alternately the inverted 1 signal is applied to E33 of the succeeding shift register. The input pattern which has passed through the bit position C34 is shifted further through C35, C36, D1, - - - up to D36 from which it is lost. the reason for this shifting up to the bit position D36 resides, as a matter of fact, in the fact that all the bits of the input pattern must be applied to the thinning unit 47 as the contents of the bit positions adjacent to the center bit position C34.

The pattern which has been subjected to the first thinning process just described is applied to the second shift register 43. The construction of the second and third thinning units 49 and 52 is identical with the first thinning unit 47. In the case of the second thinning unit 49, however, names E through H must be used in place of the register names A through D shown in FIG. 12 and the center bit position for this thinning unit is G34. Also, in the case of the third thinning unit 52, the register names A through D in FIG. 12 must be replaced with P through S and the center bit position for the third thinning unit 52 is R34.

In the second and third shift registers, the bit position E33 and P33 are provided respectively with a preset input terminal for receiving the signals applied from the mode control circuits 48 and 50, respectively, by the clock pulses $d_3$.

Figures 13, 14, 15:
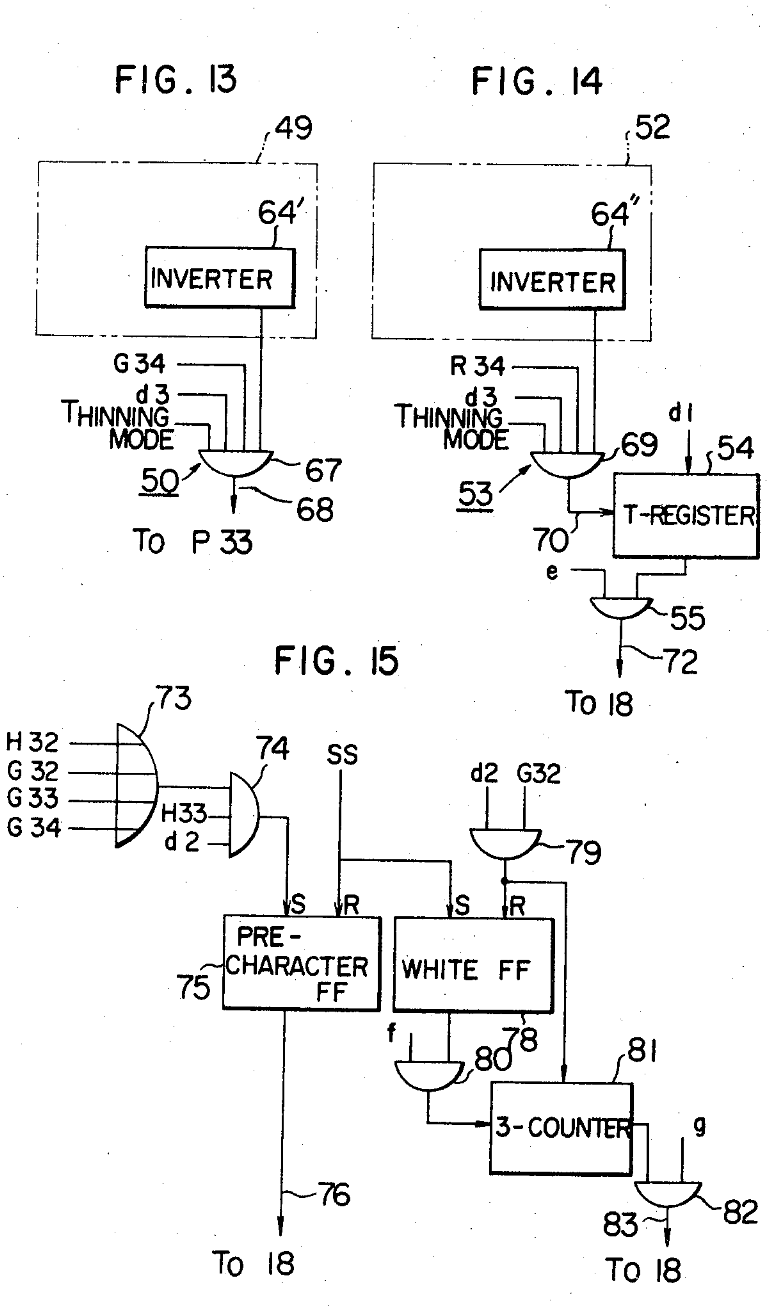
FIG. 13 is a logical diagram showing in detail the second thinning unit and the associated mode control circuit shown in FIG. 6.
FIG. 14 is a logical diagram showing in detail the third thinning unit, its associated mode control circuit, the T-register and the gate shown in FIG. 6.
FIG. 15 is a logical diagram showing in detail the pattern initializer shown in FIG. 6.

In FIG. 13, there is illustrated the mode control circuit 50 connected to the schematically shown second thinning unit 49. The mode control circuit 50 consists of an AND gate 67 which receives the output of an inverter 64' of the second thinning unit 49, the 1 output of the bit position G34, the clock pulse $d_3$ and a thinning mode signal and its output line 68 is connected to the bit position P33 of the third shift register 52.

FIG. 14 illustrates in detail the circuits connected to the schematically shown third thinning unit 52. The mode control circuit 53 consists of an AND gate 69 to which are applied the output of an inverter 64'' of the third thinning unit 52, the 1 output of the bit position R34, the clock pulse $d_3$ and a thinning mode signal and its output line 70 is connected to the T-register 54. An output line 71 of the T-register 54 is connected to the AND gate 55. By virtue of the clock pulses $e$, the AND gate 55 transfers the content of the T-register 54 to the recognition logical unit 18 through a line 72. Similarly as the bit positions E33 and P33, the T-register 54 is provided with a preset input terminal.

Both the gap filling unit 45 and the thinning unit 47 are connected to the first shift register 42 and the center bits for these processes are respectively the bit positions B33 and C34. Thus, the bit position B33 for the gap filling process is located first in the shifting direction. The thinning process is performed in in such a manner that the process is started at a point where the pattern adjoins the white background area. Consequently, if there is the gap 21$a$ as shown in FIG. 2, the process is started at this gap 21$a$ and therefore it is impossible to leave the skeletal structure constituting the characteristic properties of the pattern. Therefore, if there is the gap 21$a$, then it is important that the thinning process is initiated following the completion of the gap filling process and for this reason the center bit for the thinning process is located in the shifting direction behind the center bit for the gap filling process.

Pattern detector

FIG. 15 illustrates in detail the pattern detector 51 shown in FIG. 6. As mentioned earlier, the pattern detector 51 signifies to the recognition logical unit 18 the beginning and end of an input pattern in synchronism with the transfer of the processed input pattern to the recognition logical unit 18 through the gate 55 (FIG. 6).

In the pattern detector 51, an OR gate 73 is designed to receive the 1 outputs of the bit positions H32, G32, G33 and G34 and its output is applied to an AND gate 74. When the clock pulse $d_2$ is applied to the AND gate 74, it performs the AND operation on the output of the OR gate 73 and the output from the bit position H33. The output of the AND gate 74 sets a pre-character flip-flop 75 so that the flip-flop 75 applies its output ot the recognition logical unit 18 through a line 76 and signifies thereto the beginning of an input character. The SS signal (FIG. 7) is applied to the reset input of the pre-character flip-flop 75, resetting it at the start of the vertical scanning. The purpose of the combination of the OR gate 73 and the AND gate 74 is to indicate the beginning of the input pattern when there is a 1 signal in the bit position H33 and when there is a 1 signal in at least one of the bit positions H32, G32, G33 and G34. When the signal indicative of the beginning of the pattern is applied from the pre-character flip-flop 75, the processed signal supplied to the recognition logical unit 18 through the gate 55 during the next vertical scanning time is handled as the pattern signal. In other words, the first portion of the pattern is shifted from the bit position G32 to H32 by the $n$th scanning. Simultaneously, the processed first bits are shifted to the bit position Q32. The $(n+1)$th scanning causes the signal in the bit position H32 to pass through H33, while simultaneously the pre-character flip-flop 75 is net supplying the beginning of pattern signal to the recognition logical unit 18. Also the previously shifted signal in the bit position Q32 is simultaneously shifted to the bit position R32. Then, the $(n+2)$th scanning causes the signal in the bit position R32 to pass through R34 which constitutes the center bit for the third thinning process, so that the signal is supplied as the processed signal to the recognition logical unit 18. In this way, the signal indicative of the beginning of the pattern is applied to the recognition logical unit 18 during the $(n + 1)$th scanning, whereas the actual pattern signal is applied to the recognition logical unit 18 during the $(n + 2)$th scanning. Following the receipt of the beginning of pattern signal, the recognition logical unit 18 receives the processed signal through the gate 55 as the pattern signal during the next scanning.

In FIG. 15, there is also illustrated a white flip-flop 78. The white flip-flop 78 is reset by the logical product of the 1 signal in the bit position G32 and the clock pulse $d_2$ applied to an AND gate 79. The white flip-flop 78 derives its name from the fact that it remains in the set state during the scanning of a white background area since the pattern is inscribed in black on the white background. The white flip-flop 78 is set by the SS signal at the instant when the vertical scanning is initiated. If, during this scanning, a 1 signal (a 1 signal indicating the presence of the pattern) is not shifted to the bit position G32 of the second shift register 43, the AND gate 79 is not opened and thus the white flip-flop 78 is not reset but receives the SS signal due to the initiation of the next vertical scanning. An AND gate 80 produces the logical product of the set output of the white flip-flop 78 and the clock pulse $f$ which appears approximately at the end of each scanning and its output is applied to a 3-counter 81. The 3-counter 81 increases its count each time it receives a pulse from the AND gate 80 and it is cleared by the output pulse of the AND gate 79. Accordingly, if no 1 signal (black signal) appears in the bit position G32 during three continuous vertical scanning times, the 3-counter 81 counts to three and supplies its output to an AND gate 82. The AND gate 82 performs the AND operation on the output of the 3-counter 81 and the clock pulse $g$ which appears slightly later than the clock pulse $f$ and supplies an output signal to the recognition logical unit 18 by way of a line 83. This signal is utilized as one which indicates the end of the pattern. That is, since the patterns (characters) are inscribed on the document at intervals of over three scannings, the absence of any pattern during the three scannings indicates the end of one pattern. When the signal indicating the end of the pattern is applied to the recognition logical unit 18 through the line 83, the pattern which has been transferred to the recognition logical unit after the completion of the three thinning processes comprises only the actual pattern structure and the white background area for one scanning. In other words, when the third white background area passes the bit position G32, the first white background area passes the bit positon R34 which constitutes the center bit for the third thinning process.

During the time interval between the receipt of the beginning of pattern signal and the receipt of the end of pattern signal, the recognition logical unit 18 accepts the pattern which has been subjected to three thinning processes and subject it to the process of recognition.

We claim:

1. In a pattern recognition system, a pattern pre-processing apparatus for modifying a quantized input pattern obtained by the scanning of a pattern, by the conversion into a first digital value of a signal produced in the case of said scanning of a pattern area, and by the conversion into a second digital value of a signal produced in the case of said scanning of a background area, said pattern pre-processing apparatus comprising:

at least one shift register for storing and shifting therein said input pattern in the order in which it has been scanned, and pattern thinning means for receiving, on the basis of a first prespecified bit position of said shift register, the bit contents in accordance with said input pattern of said shift register corresponding to selected bit positions located adjacent to said first prespecified bit position, including means for producing a signal of said second digital value when the contents of said adjoining bit positions indicate any one of predetermined patterns, and for producing a signal indicating as before the content of said first prespecified bit position when the contents of said adjoining bit positions indicate none of said predetermined patterns, said pattern thinning means including a plurality of circuit means for examining whether said contents of said adjoining bit positions indicate any one of said predetermined patterns, said circuit means producing a signal of said second digital value as an output of said pattern pre-processing apparatus when the content of a peripheral portion of said pattern area is shifted to said first prespecified bit position, thereby leaving only a skeletal portion of said pattern area in the state of said first digital value.

2. A pattern pre-processing apparatus according to claim 1, further including gap filling means for receiving, on the basis of a second prespecified bit position of said shift register located in the rear of said first prespecified bit position in the shifting direction, the bit contents in accordance with the input pattern of the shift register corresponding to selected bit positions located adjacent to said second prespecified bit position and converting the content of said second prespecified bit position into said first digital value when said selected bit positions located adjacent to said second prespecified bit position indicate a predetermined condition.

3. A pattern pre-processing apparatus according to claim 1, further including detecting means, said detecting means producing a signal indicative of the beginning of the input pattern when the content of a third prespecified bit position of the shift register and the bit contents in accordance with the input pattern of the shift register corresponding to selected bit positions located adjacent to said third prespecified bit position indicate a predetermined condition, said detecting means producing a signal indicative of the end of the input pattern when said first digital value has not been shifted to a fourth prespecified bit position of the shift register during a predetermined number of scanning.

4. A pattern pre-processing apparatus according to claim 2, further including detecting means, said detecting means producing a signal indicative of the beginning of the input pattern when the content of a third prespecified bit position and the bit contents in accordance with the input pattern of the shift register corresponding to selected bit positions located adjacent to said third prespecified bit position indicate a predetermined condition, said detecting producing a signal indicative of the end of the input pattern when said first digital value has not been shifted to a fourth prespecified bit position of the shift register during a predetermined number of scanning.

5. A pattern pre-processing apparatus according to claim 1, wherein said pattern thinning means comprise a plurality of AND logic means each producing a signal when, on the basis of the first prespecified bit position of the shift register, the bit contents in accordance with the input pattern of the shift register corresponding to selected bit positions located adjacent to the first prespecified bit position indicate associated one of the predetermined patterns, and output means for producing a signal of said first digital value when at least one of said plurality of AND logic means produces a signal, and for producing a signal indicating as before the content of the first prespecified bit position when none of said plurality of AND logic means produces a signal.

6. In a pattern recognition system, a pattern pre-processing apparatus for modifying a quantized input pattern obtained by the scanning of a pattern, by the conversion into a first digital value of a signal produced in the case of the scanning of a pattern area, and by the conversion into a second digital value of a signal produced in the case of the scanning of a background area, said pattern pre-processing apparatus comprising: a first shift register for storing and shifting said input pattern in the order in which said input pattern has been scanned; gap filling means for receiving, on the basis of a second prespecified bit position of said first shift register, the bit contents in accordance with said input pattern of said first shift register corresponding to selected bit positions located adjacent to said second prespecified bit position and putting the content of said second prespecified bit position into the first digital value when the contents of said adjacent bit positions indicate a predetermined condition; first pattern thinning means for receiving, on the basis of a first prespecified bit position of said first shift register, the bit contents in accordance with said input pattern of said first shift register corresponding to selected bit positions located adjacent to said first prespecified bit position for producing a signal of the second digital value when the contents of said bit positions located adjacent to said first prespecified bit position indicate any one of predetermined patterns, and for producing a signal indicating as before the content of said first prespecified bit position when the contents of said bit positions located adjacent to said first prespecified bit position indicate none of said predetermined patterns, thereby converting the first digital value of said first prespecified bit position into the second digital value when a signal obtained from a peripheral portion of said pattern area is shifted to said first prespecified bit position of said shift register; a second shift register for sequentially receiving the output signals from said first pattern thinning means to store and shift therein; detecting means for producing a signal indicative of the beginning of said input pattern when the content of a third prespecified bit position in said second shift register and the bit contents in accordance with said input pattern of said second shift register corresponding to selected bit positions located adjacent to said third prespecified bit position indicate any one of the predetermined set of conditions, said detecting means producing a signal indicative of the end of said input pattern when the first digital value has not been shifted to a fourth bit position in said second shift register during a predetermined number of scanning; second pattern thinning means for receiving, on the basis of a fifth prespecified bit position in said second shift register, the bit contents in accordance with said input pattern of said second shift register corresponding to selected bit positions located adjacent to said fifth prespecified bit position for producing a signal of the second digital value when the contents of said selected bit positions located adjacent to said fifth prespecified bit position indicate any one of the predetermined patterns, and for producing a signal indicating as before the content of said fifth prespecified bit position when the contents of said bit positions located adjacent to said fifth prespecified bit position indicate none of said predetermined patterns, thereby converting the first digital value of said fifth prespecified bit position into the second digital value when a signal obtained from a peripheral portion of a pattern area which is thinned by said first pattern thinning means is shifted to said fifth prespecified bit position of said second shift register; a third shift register for sequentially receiving the output signals from said second pattern thinning means to store and shift therein; and third pattern thinning means for receiving, on the basis of a sixth prespecified bit position in said third shift register, the bit contents in accordance with said input pattern of said third shift register corresponding to selected bit positions located adjacent to said sixth bit position for producing a signal of the second digital value when the contents of said selected bit positions located adjacent to said sixth bit position indicate any one of the predetermined patterns, and for producing a signal indicating as before the content of said sixth prespecified bit position when the contents of said bit positions located adjacent to said sixth prespecified bit position indicate none of the predetermined patterns, thereby leaving a skeletal portion of said input pattern in the state of the first digital value.

* * * * *